United States Patent [19]

Bateman et al.

[11] Patent Number: 4,567,483

[45] Date of Patent: Jan. 28, 1986

[54] POSITION BASED GROUND PROXIMITY WARNING SYSTEM FOR AIRCRAFT

[75] Inventors: Charles D. Bateman; Michael M. Grove; Lyle J. Noland; Wallace E. Ward, all of Bellevue, Wash.

[73] Assignee: Sundstrand Data Control, Inc., Redmond, Wash.

[21] Appl. No.: 448,862

[22] Filed: Dec. 10, 1982

[51] Int. Cl.⁴ .................. G08B 23/00; G01S 13/00
[52] U.S. Cl. .................. 340/970; 73/178 T; 340/967; 343/7 TA; 364/433
[58] Field of Search .......... 340/963, 970, 968, 969, 340/967, 959, 977; 343/12 A, 7 TA; 244/180; 364/433; 73/178 R, 178 T

[56] References Cited

U.S. PATENT DOCUMENTS

| | | | |
|---|---|---|---|
| 3,715,718 | 2/1973 | Astengo | 340/964 |
| 3,922,637 | 11/1975 | Bateman | 340/963 |
| 3,925,751 | 12/1975 | Bateman et al. | 340/384 R |
| 3,934,221 | 1/1976 | Bateman et al. | 343/7 TA |
| 3,934,222 | 1/1976 | Bateman et al. | 343/7 TA |
| 3,944,968 | 3/1976 | Bateman | 343/7 TA |
| 3,946,358 | 3/1976 | Bateman | 340/967 |
| 3,947,808 | 3/1976 | Bateman | 340/970 |
| 3,947,809 | 3/1976 | Bateman | 343/7 TA |
| 3,947,810 | 3/1976 | Bateman et al. | 343/7 TA |
| 3,958,218 | 5/1976 | Bateman | 73/178 R |
| 4,030,065 | 6/1977 | Bateman | 244/180 |
| 4,060,793 | 11/1977 | Bateman | 244/180 |
| 4,215,334 | 7/1980 | Bateman | 73/178 R |
| 4,224,669 | 9/1980 | Brame | 343/7 TA |
| 4,319,218 | 3/1982 | Bateman | 73/178 T |
| 4,431,994 | 2/1984 | Gemin | 343/12 A |
| 4,433,323 | 2/1984 | Grove | 73/178 T |
| 4,495,483 | 1/1985 | Bateman | 340/960 |

Primary Examiner—James J. Groody
Attorney, Agent, or Firm—Mason, Kolehmainen, Rathburn & Wyss

[57] ABSTRACT

In order to reduce nuisance warnings and to increase the effectiveness of real warnings produced by a ground proximity warning system, the criteria for generating a warning is varied for certain airport areas to take into account the terrain in those areas. Along with position data, certain flight parameters such as heading, altitude, glideslope and localizer deviation are checked by the system in order to ensure that the aircraft is located in the desired warning modification area. In addition, the ground proximity warning system includes a mechanism for ensuring that the corrected barometric altitude of the aircraft is within acceptable limits.

29 Claims, 9 Drawing Figures

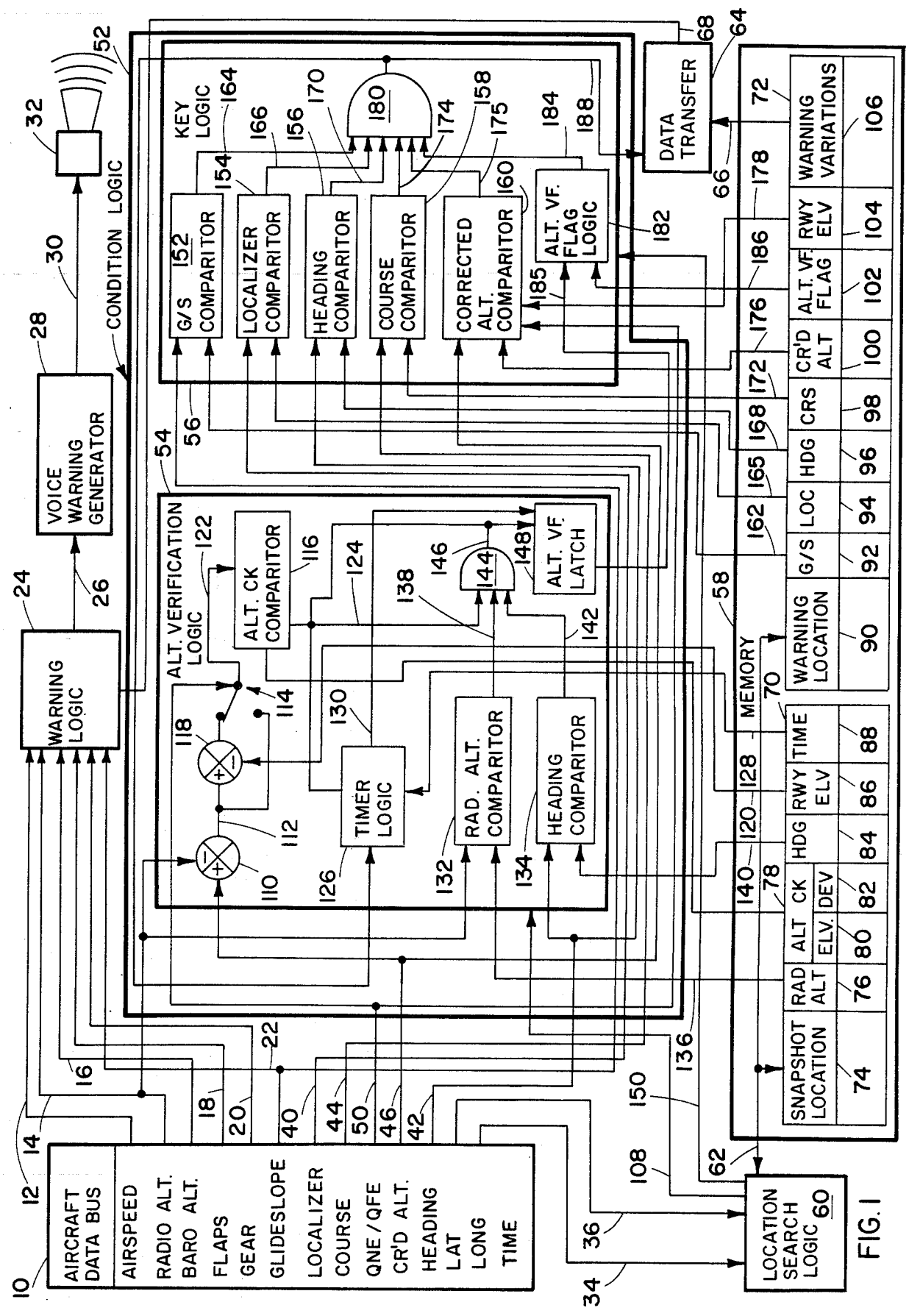

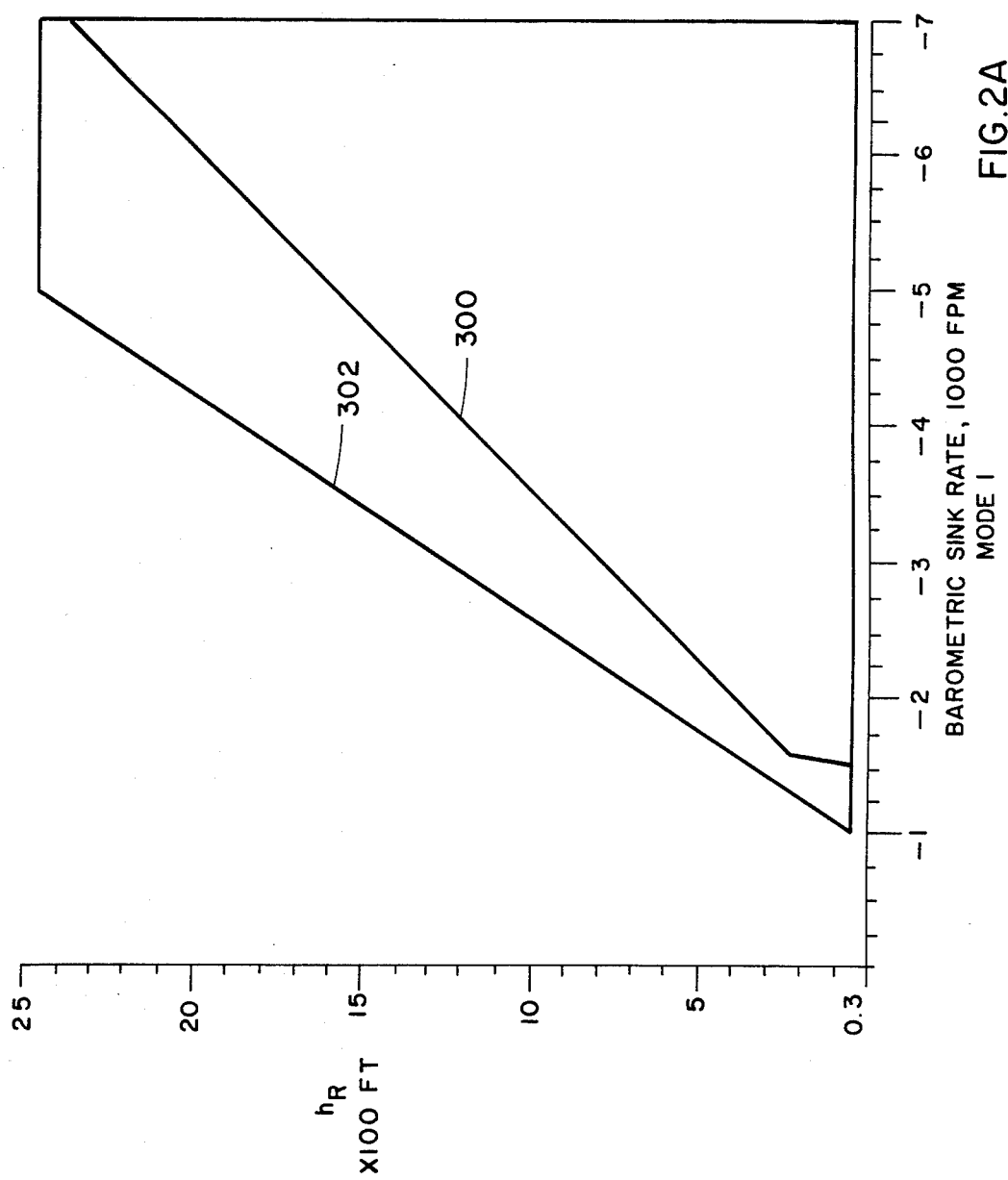

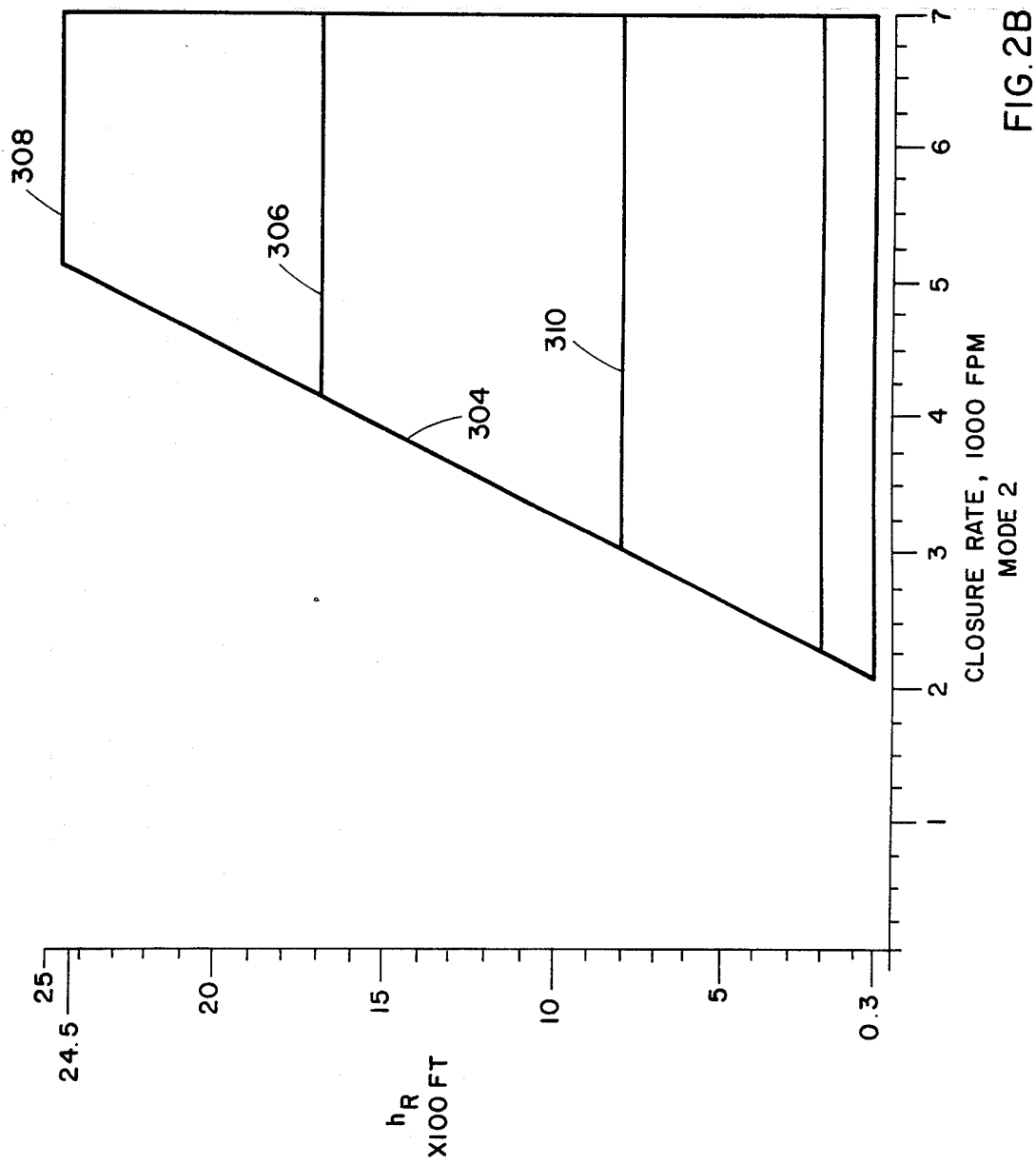

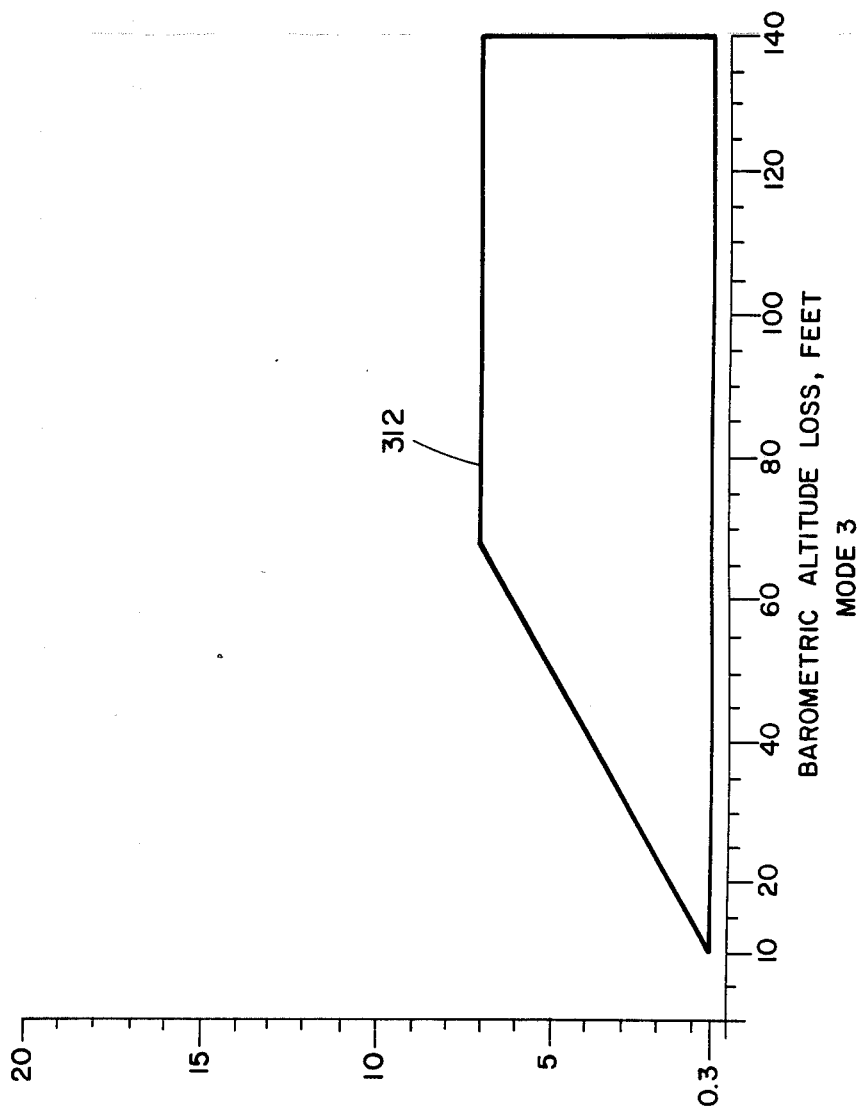

POSITION BASED GROUND PROXIMITY WARNING SYSTEM FOR AIRCRAFT

TECHNICAL FIELD

The invention relates to the field of aircraft ground proximity warning systems and more particularly to ground proximity warning systems wherein the warning criteria is varied with respect to the geographical position of the aircraft.

BACKGROUND OF THE INVENTION

In prior art ground proximity warning systems the warning criteria or warning envelopes have been normalized to provide a practical balance between giving a pilot timely warning when the aircraft is in a situation where inadvertent flight into terrain is a possibility while at the same time resulting in a minimum of nuisance warnings. A nuisance warning is a warning generated by a ground proximity warning system when the aircraft is operating normally with respect to the terrain and there is little or no danger of inadvertently flying into the ground. Nuisance warnings are, however, considered to be highly undesirable in that they tend to reduce pilot confidence in the warning system and may result in the pilot disregarding a subsequent valid ground proximity warning. As a result it has always been considered highly desirable to minimize nuisance warnings to the maximum extent compatible with providing timely warnings where the aircraft is actually in some danger of impacting the ground. Heretofore attempts to reduce nuisance warnings have centered primarily on the attempt to provide optimum warning envelopes for each type of terrain encountered by the aircraft such that one set of warning envelopes would provide a balance between nuisance warnings and actual warnings worldwide. Illustrations of prior art attempts to provide normalized warning envelopes or criteria for all flight situations are provided in U.S. Pat. Nos.

| | |
|---|---|
| 3,715,718 | 3,934,221 |
| 3,946,358 | 3,925,751 |
| 3,958,218 | 3,934,222 |
| 3,922,637 | 4,030,065 |
| 3,944,968 | 4,060,793 |
| 3,947,809 | 4,215,334 |
| 3,947,808 | 4,319,218 |
| 3,947,810 | |

As a result of extensive studies of ground proximity warning systems in commercial use throughout the world, it has been discovered that there are instrument approaches to certain airports where the terrain along the approach path may be such that the warning time in the case of an actual ground proximity warning is not optimum if the airport is located at a relatively high altitude with respect to the surrounding terrain. An example of this type of situation is the instrument landing system approach to runway 24 at Hot Springs, Va., where the terrain underlying the approach climbs rapidly up to the runway elevation. Consequently, the aircraft might not reach the radio altimeter arming height for the glideslope mode until the aircraft is within one-half nautical mile of the runway threshold which may be too late for recovery of the aircraft if it has inadvertently descended below the runway elevation. Similarly there are a number of airports where because of the underlying terrain, the approaches or departures may result in an undesirable number of nuisance-type warnings. These airport approaches or departures include runway 13 at Hong Kong, runway 15 at Leeds Bradford, United Kingdom, runway 26R at Ontario, Calif. and runway 26 at Victoria, British Columbia.

SUMMARY OF THE INVENTION

It is therefore an object of the invention to provide a ground proximity warning system for aircraft that includes a source of signals representing aircraft flight parameters; a warning logic circuit for comparing the flight parameter signals and generating a warning signal in response to predetermined relationships between selected flight parameter signals; a source of position signals representing the position of the aircraft; and condition logic for varying the predetermined relationships for generating warning signals when the aircraft is in a predetermined warning location. One feature of the invention is key logic for comparing at least one of the flight parameter signals to a predetermined value when the aircraft is in one of the predetermined warning locations and is effective to inhibit the variation of the predetermined relationships when the compared flight parameter signal does not correspond to the predetermined value. Another feature of the invention is altitude verification logic, responsive to a radio altitude signal and a barometric altitude signal and the position signal, that is effective to generate an altitude verification signal representing the confidence level of the barometric altitude of the aircraft for a specific location of the aircraft.

It is an additional object of the invention to provide a ground proximity warning system for aircraft that includes sources of radio altitude, barometric altitude, and glideslope signals as well as position signals representing the location of the aircraft; warning logic for generating a warning signal in response to predetermined relationships between the radio altitude, barometric altitude and glideslope signals; and condition logic responsive to the position signals for varying one or more of the predetermined relationships when the aircraft is in a predetermined position. An additional feature is key logic responsive to glideslope localizer and heading signals to generate a signal inhibiting the variation of the predetermined relationships when one or more of the localizer, glideslope or heading signals does not correspond to a predetermined value. The system can also include a memory for storing a set of predetermined signal values for each of the predetermined warning areas.

BRIEF DESCRIPTION OF THE DRAWINGS

FIG. 1 is a logic diagram of a ground proximity warning system wherein warning criteria is varied as a function of aircraft location;

FIGS. 2A–2E are graphical illustrations of ground proximity warning system warning envelopes for various warning modes;

DETAILED DESCRIPTION OF THE INVENTION

Figure 2D:
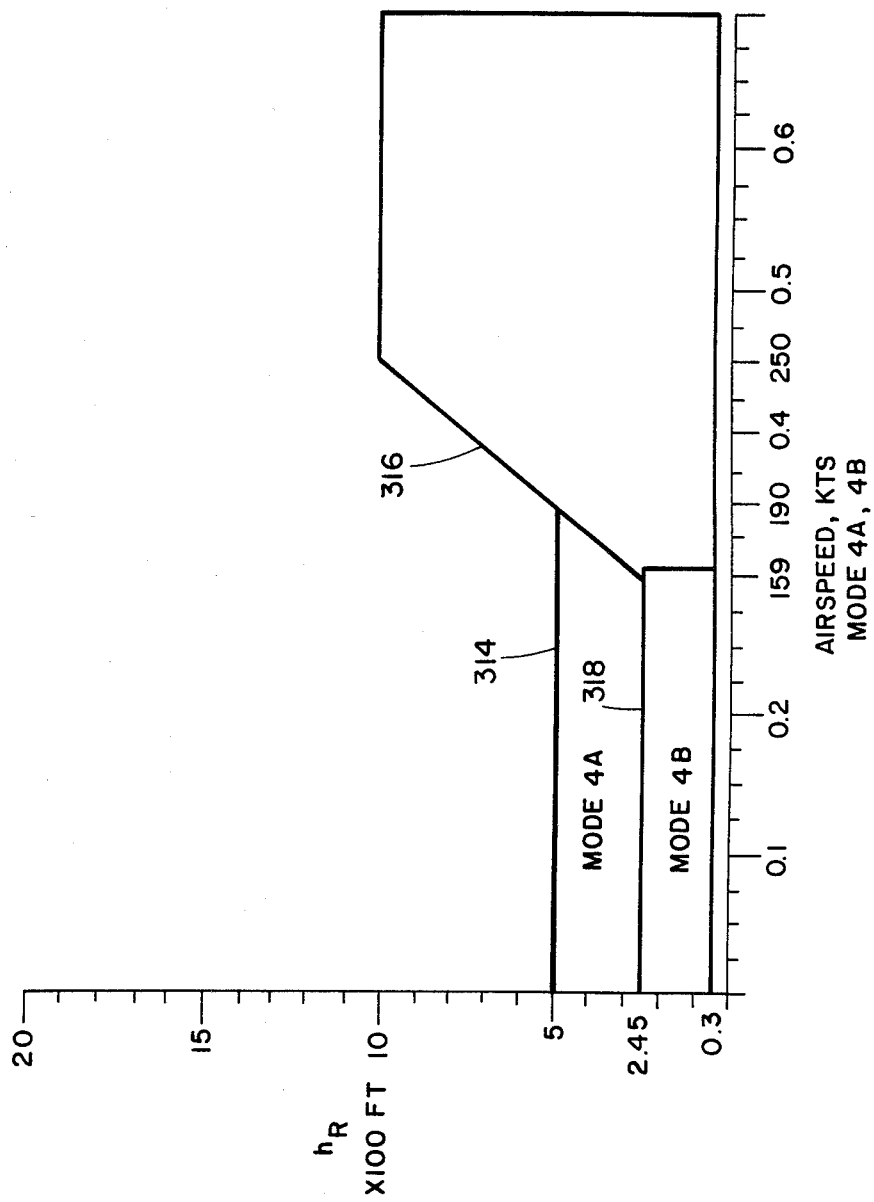

Represented in logic diagram form in FIG. 1 is the preferred embodiment of a ground proximity warning system wherein warning criteria is varied with respect to the location of the aircraft. Indicated within box 10 is an aircraft data bus that provides various signals to the ground proximity warning system. A detailed description of the signals available to a ground proximity warning system is provided in the ARINC Characteristic 429 as published by Aeronautical Radio, Incorporated of Annapolis, Md. Included in the signals provided by the aircraft data bus 10 is an airspeed signal on line 12, a radio altitude signal on line 14, a barometric altitude signal on line 16, flap and gear position signals on lines 18 and 20 and a radio glideslope signal on line 22. These signals are then used as inputs to a warning logic circuit 24 which in turn is effective to generate a warning signal on line 26 whenever the various flight parameters as indicated by the signals on lines 12-22 indicate that the aircraft is in an unsafe condition with respect to the terrain. The warning signal on line 26 is then applied to a voice warning generator 28 that in turn generates a voice warning signal over line 30 resulting in a voice warning being generated by means of a cockpit speaker 32.

The various warning criteria or warning envelopes for each warning mode are illustrated in FIGS. 2A-2E of the drawings. The warning envelopes in FIG. 2 are similar to the warning envelopes published in ARINC characteristic 723. Specific circuits or means for generating warning signals on line 26 by means of the warning logic 24 are described in detail in the patents listed in the background of the invention.

In FIG. 2A of the drawings is illustrated the warning envelope or warning criteria for the barometric sinkrate mode, which is commonly referred to as Mode 1, for a ground proximity warning system. This particular warning envelope and the method of its generation is described in detail in U.S. Pat. No. 4,060,793. In the graphical illustration of FIG. 2A the horizontal axis represents the sinkrate of the aircraft measured with respect to barometric altitude and the vertical axis represents the altitude above ground of the aircraft measured in radio altitude. Line 300 in FIG. 2A indicates the relationship between sinkrate and radio altitude that will generate a "pull-up" voice warning and the line 302 indicates the relationship between barometric sinkrate and radio altitude required to generate a "sinkrate" voice warning. As indicated in FIG. 2A, greater barometric sinkrates are permitted by the ground proximity warning system logic 24 for greater radio altitudes.

The closure rate warning mode warning envelope is illustrated in FIG. 2B of the drawings. This mode is commonly referred to as Mode 2A and 2B and is effective to generate a warning when the aircraft closure rate with respect to the terrain as measured by the radio altimeter exceeds a permissible value for the aircraft radio altitude. In FIG. 2B the closure rate which is measured in rate of radio altitude is shown in the horizontal axis and radio altitude is illustrated on the vertical axis. The warning area for Mode 2A is indicated by lines 304 and 306 with an enhancement to the warning area of Mode 2A as a function of airspeed indicated by the line 308. Operation of Mode 2A is described in U.S. Pat. No. 3,934,221 and the airspeed enhancement in U.S. Pat. No. 3,958,218. Mode 2B as defined in ARINC characteristic 723 is illustrated by line 310 and normally has an operational limitation between 200 ft. and of 790 ft. above the terrain. Mode 2B normally becomes operational only when the aircraft is in landing configuration and replaces Mode 2A.

The descent after takeoff warning mode, commonly referred to as Mode 3, is illustrated in FIG. 2C of the drawings wherein a measure of barometric altitude loss is plotted on the horizontal axis and the aircraft's radio altitude is plotted on the vertical axis. The warning envelope for this warning mode is indicated by line 312. This particular warning mode is described in detail in U.S. Pat. No. 3,947,810.

In FIG. 2D is illustrated the terrain clearance warning mode, commonly referred to as Mode 4A and Mode 4B. In the warning envelope of FIG. 2D the horizontal axis represents the aircraft airspeed in Knots and the vertical axis represents the aircraft's radio altitude. In the envelope as shown in FIG. 2D, line 314 indicates the Mode 4A warning area which results when the aircraft approaches the ground with the landing gear up. Similarly line 318 indicates the Mode 4B warning area which results when the aircraft is too close to the ground with the flaps up. The portion of the warning envelope indicated by line 316 indicates the criteria by which a "too low terrain" voice warning is given for both Mode 4A and 4B as a function of airspeed. The operation of Mode 4 as illustrated above is described in U.S. Pat. No. 4,030,065.

Figure 2E:
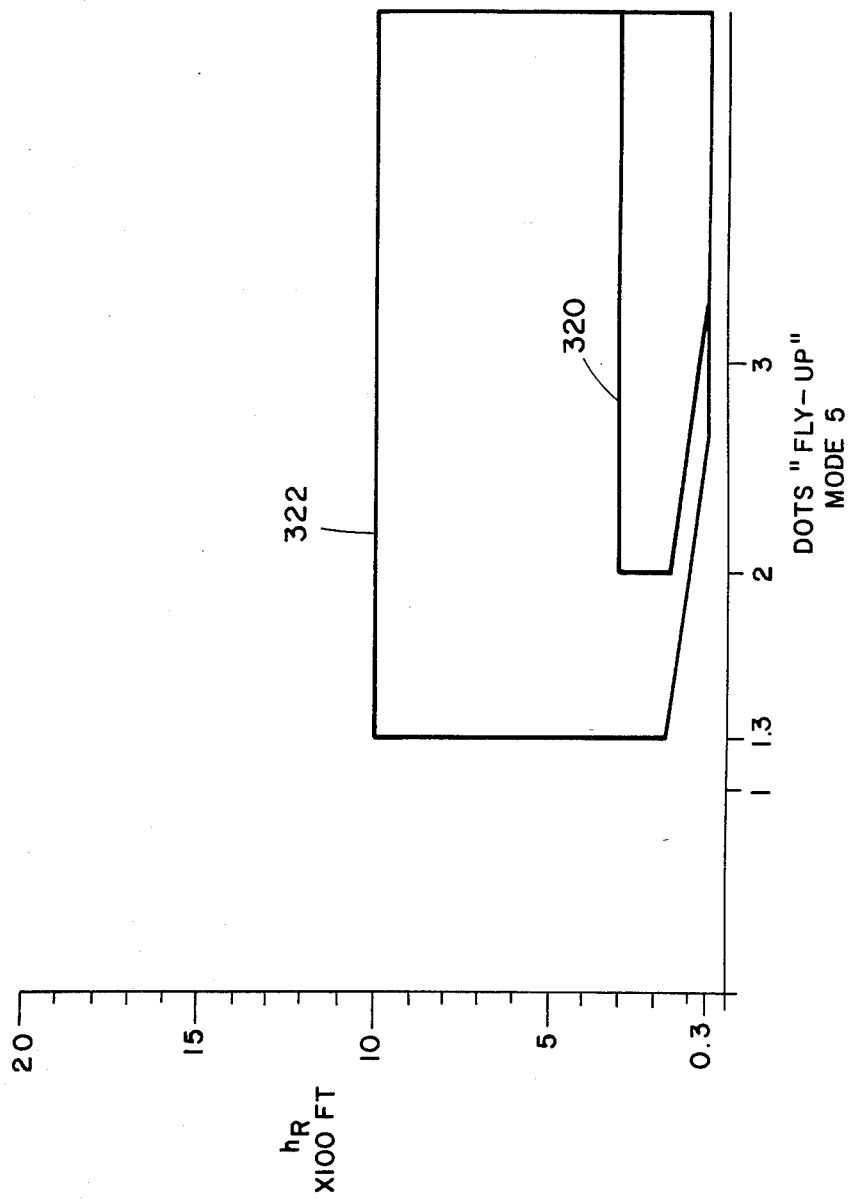

An illustration of the glideslope warning mode, commonly referred to as Mode 5, is provided in FIG. 2E. In the warning envelope shown in FIG. 2E the horizontal axis represents the glideslope signal as measured in dots, which is an indication of the angular deviation of aircraft below the glideslope radio beam, and the vertical axis represents the aircraft's radio altitude. The line 320 indicates the warning criteria for generating a hard warning and the line 322 indicates the criteria for generating a soft glideslope warning. An example of the implementation of a glideslope warning mode of this type is provided in U.S. Pat. No. 3,925,751.

One of the objects of the invention is to provide for changes in the warning envelopes shown in FIG. 2 such that optimum ground proximity warning system performance is achieved in certain specified areas without significantly compromising the overall ground proximity warning system effectiveness.

Ground proximity warning system implementation as described in the aforementioned patents over the past several years has resulted in a number of system improvements which both enhanced and desensitized the original ground proximity warning system mode envelope protection to facilitate particular flight path situations at or near airports. However, a few of the more unusual cases were not addressed because of the large impact on overall current ground proximity warning system effectiveness. Most of these cases involve potential nuisance warnings due to precipitous terrain near specific airports, but there are some cases where mode envelope protection could be expanded to better protect against inadvertent descent below the desired glidepath.

The advent of new digital sensors, avionics and in particular, navigational equipment make it possible to accurately fix the aircraft location with respect to latitude, longitude, altitude and heading. These signals are now basic to most new or proposed large turbo jet aircrafts and are available to the ground proximity warning system via the aircraft data bus 10.

Consequently, it is possible for the ground proximity warning system to identify unique topographical locations and accurately determine if the aircraft has entered these locations. This information together with appropriate flight path details can then be used to adjust the ground proximity warning system warning envelopes of FIGS. 2A–2E to be compatible with the peculiarities of that topographical area without compromising performance outside of the area.

The concept of restricting the ground proximity warning system envelope changes to only unique situations is of paramount importance and the described apparatus is aimed at achieving that result. In all cases, if any one of the conditions required to establish a unique situation is not met or at any time fails, ground proximity warning system operation reverts to the ground proximity warning system warning envelopes shown in FIGS. 2A–2E.

The following describes a method of accurately determining aircraft flight path and position with respect to the surrounding topography. This information is then used to activate alternate mode envelope parameters which are more suited to the peculiarities associated with the designated location and flight path.

The primary concern associated with any method of altering ground proximity warning system operation is that overall protection not be significantly compromised. Therefore, in all cases where ground proximity warning system protection is to be desensitized against nuisance warnings or enhanced to provide earlier warnings associated with particular flight paths, every effort should be made to identify those situations uniquely, thereby altering the corresponding mode envelopes only for those situations. The mechanism employed to realize this objective is to impose conditions on specific aircraft flight parameters which must remain satisfied for the mode envelope parameter changes to persist. These input conditions determine a "key" that uniquely fits an associated location and flight path. Again, if any one of the inputs does not, at all times, meet the prescribed conditions, the key will not fit and normal ground proximity warning system operation is resumed.

The signal inputs from the data bus 10 used as conditions for the key in the system of FIG. 1 are listed below:

Latitude (LAT) on line 36/Longitude (LONG) on line 34
Glideslope Deviation (G/S) on line 22
Localizer Deviation (LOC) on line 40
Magnetic Heading (HDG) on line 42
Runway Course (CRS) on line 44
QNH or QFE Corrected Barometric Altitude (CR'D ALT) on line 46
QNH/QFE Altitude Correction Indication logic signal on line 50 (PRGM=QFE MODE, DEFAULT=QNH MODE)
QNH="0" ft at sea level QFE="0" ft at touchdown elevation Sixteen areas where peculiarities of airport approaches or departures are not entirely compatible with standard ground proximity warning system operation are identified in this specification. Associated with each case is LAT/LONG information defining boundaries of topographical areas within which specified ground proximity warning system envelope changes are to be made for particular flight paths. This LAT/LONG information uniquely defines the area and provides the basis for each key. State of the art navigational equipment provides LAT/LONG signals with a maximum drift error of 2 nautical miles (NM) per hour of flight time. Therefore, if a maximum flight time of 2 hours is assumed, it is conceivable that the LAT/LONG information could be in error by a maximum of 4 NM. Some navigational systems use Distance Measuring Equipment (DME) information to update the LAT/LONG signal and thereby restrict the drift error to between DME updates. Nearly all controlled airports have DME available, so in these cases, LAT/LONG accuracy is significantly better. However, DME updating is not assumed for this embodiment of the invention. All of the cases identified require conditions in addition to LAT/LONG being within defined boundaries to satisfy the "key". These conditions serve to further restrict the flight path within the given area in terms of HDG, CRS, CR'D ALT and whether or not the aircraft is within the G/S and LOC beams. The cases which use CR'D ALT as a condition for the "key" require that the ground proximity warning system has verified the accuracy of this signal prior to its use to avoid significant correction errors that might be inadvertently introduced by the flight crew. This verification is accomplished using a snapshot of the RAD ALT as described in a subsequent portion of this specification.

The information in this section of the specification expands upon the summary (Tables I, II and III) included herein. Each of the conditions required for the key is described in detail in the tables.

Airport/runway: The airport approach or departure is identified in this column for each of the sixteen cases. Also included is the runway (RWY) elevation which is used for QFE correction.

Envelope changes: This column defines the changes in the mode envelopes, FIGS. 2A–2E, to be implemented when the key fits. All changes are parametric in nature, i.e. they involve only changes in parameter values (e.g. limits, envelope corner points and arming altitudes and conditions).

Required conditions (Key): The conditions on designated valid inputs from the data bus 10 that must be satisfied for the changes defined in the previous column to be implemented are given in this section. These conditions define the "key" for the appropriate airport. The inputs for which "N/A" (not applicable to this case) is shown, are not required to make the key fit. Again, failure of any input to meet the designated conditions or loss of validity results in a return to the standard ground proximity warning system operational warning envelopes of FIGS. 2A–2E.

G/S: A less than (+/−) 2 dots deviation within the G/S beam is required for the cases specified in this column. This condition has been primarily used for mode desensitization cases to fix the aircraft vertical orientation where minimum terrain clearance on approach is a factor and a reliable G/S signal 22 exists.

LOC: A less than (+/−) 2 dots LOC deviation is required for those cases which have the LOC column specified. The LOC signal 40 is used as a condition for the key for mode desensitization on approach whenever it is available as a reliable signal.

HDG: HDG signal 42 has been included as part of the key for all cases (Victoria uses HDG as a condition for the CR'D ALT verification only) in order that flight path direction within the designated LAT/LONG can be ascertained. A (+/−) 30° tolerance is typically included to allow for cross wind correction by the pilot. CRS: The CRS signal 44 is examined when it is available. This identifies the particular approach that is being attempted and primarily serves to verify the associated conditions on flight path and location as appropriate for the designated CRS. A (+/−) 10° tolerance is allowed.

CR'D ALT: A minimum CR'D ALT is required for mode desensitization where a minimum terrain clearance problem on approach or departure exists and G/S signal 22 is not available to fix the aircraft vertical orientation. The CR'D ALT signal is verified by a snapshot of the radio altimeter signal 14. This procedure is detailed in the next paragraph. Furthermore, some aircraft use a QFE barometric altitude correction procedure instead of the normal QNH method, the difference being that the QNH setting results in altitude above sea level while the QFE setting indicates altitude above the airport runway (i.e. QFE is calibrated to read "0" feet at touchdown). Both methods (QFE and QNH) are to be covered in this embodiment, therefore the QFE values of minimum CR'D ALT are included in parenthesis. The QFE indicated CR'D ALT is always less than the corresponding QNH value, provided the runway is above sea level.

Altitude Verification: The CR'D ALT signal 46 is a function of pilot entered barometric compensation and is therefore subject to human error. Consequently, a snapshot of the radio altimeter signal 14 is taken and compared to the CR'D ALT signal 46 to verify the CR'D ALT when a useable radio altimeter signal 14 exists. In some cases, the snapshot must be taken when the RAD ALT exceeds 2500 ft. in order that sufficiently flat terrain can be sampled. Therefore, if the RAD ALT signal 14 in use saturates at an altitude less than that required for the snap-shot, this condition will not be met and no mode desensitization will take place for that airport. (Most of the new generation Radio Altimeters come into track at altitudes significantly higher than 2500 ft.) However, most of the cases involve RAD ALTs less than 2500 ft. In those cases where a snapshot is required, the following conditions have been established for the key:

Altitude Verification Location: An area, which is crossed immediately before the envelope modulation area is reached, as defined by LAT/LONG coordinates. When the LAT/LONG signals 34 and 36 indicate that the aircraft is within this area, a RAD ALT and CR'D ALT snapshot are taken. In some cases, additional conditions may be required to take snapshots. Three consecutive snapshots of RAD ALT and CR'D ALT within the prescribed condition are required in the preferred embodiment of the invention before the actual altitude check can be made. Once a snapshot is accomplished, the corresponding values of RAD ALT signal 14 are compared to the CR'D ALT signal 46 in the next step. Failure to achieve three snapshots results in no envelope changes.

ALT Check: Once three consecutive snapshots of RAD ALT 14 and CR'D ALT 45 have been taken within the verification area, the RAD ALT 14 signals are subtracted from the CR'D ALT signals 46 and the average of three consecutive values is calculated. The result is indicative of the elevation of the terrain within the verification area, or in the case of QFE, CR'D ALT, indicative of the terrain elevation less the runway elevation. Both the QNH and the QFE values (given in parenthesis) expected for this result are listed in the ALT CK column. A tolerance which varies with the flatness of the terrain in the verification area is also allowed. Also included in the ALT CK column is the minimum RAD ALT (Radio Altitude) that is expected for the snapshot location. As is the case for all conditions, failure to meet these conditions means the key does not fit.

Maximum allowed time: Subsequent to meeting the LAT/LONG coordinates and ALT check conditions of the snapshot, a maximum allowable time has been assigned in which to reach the warning location described in the next paragraph. This time is a reflection of the maximum distance between the verification area and the warning location at the minimum expected aircraft speed for this distance. Failure to reach the LAT/LONG defined warning area within the allotted time voids the verification condition status and the key does not fit. It should also be noted that if a system failure occurs subsequent to the altitude verification, the verification condition status is voided and the key does not fit.

Warning location: Each location is assigned LAT/LONG coordinates which define a boundary encompassing the problem area. This LAT/LONG information is unique with respect to any other area on the surface of the earth. The boundary consists simply of a box with corresponding minimum and maximum latitiudes and longitudes, in the cases defined to date. This information along with the shape and dimensions of the box is given in the "Envelope Mode Area" column. Satisfaction of the LAT/LONG boundary condition is necessary before the remainder of the conditions of the key are verified, except in the case where an altitude verification is required prior to entering the warning location. This avoids unnecessary checks of the other required conditions while not in a defined area. Finally, of course, any time the LAT/LONG signal indicates that the aircraft has left the warning area the system immediately reverts back to standard ground proximity warning system warning envelopes of FIGS. 2A–2E.

The following paragraphs and the associated Tables I, II and III define the specific airport approaches or departures at which envelope changes are to be made.

Hong Kong, B.C.C.—RWY 13:—Hong Kong uses an Instrument Guidance System (IGS) for approach on RWY 13. The IGS flight path is followed to the Middle Marker (MM) at which time visual flight conditions are required in order that a right turn and immediate descent to the runway can be made. If visual flight conditions do not exist at the MM, a pull-up procedure is mandatory. Often the descent from the MM to the runway is quite rapid because the underlying terrain falls off quickly. The result has been a relatively high Mode 1 nuisance warning rate on this approach. Consequently, for the conditions in Table I, the Mode 1 "sinkrate" envelope has been shifted 500 FPM to the right at this approach. Furthermore, in order that a Mode 1 "sinkrate" warning is always given before the corresponding "pull-up" warning, the "pull-up" envelope has been shifted 200 FPM to the right.

Figure 3:
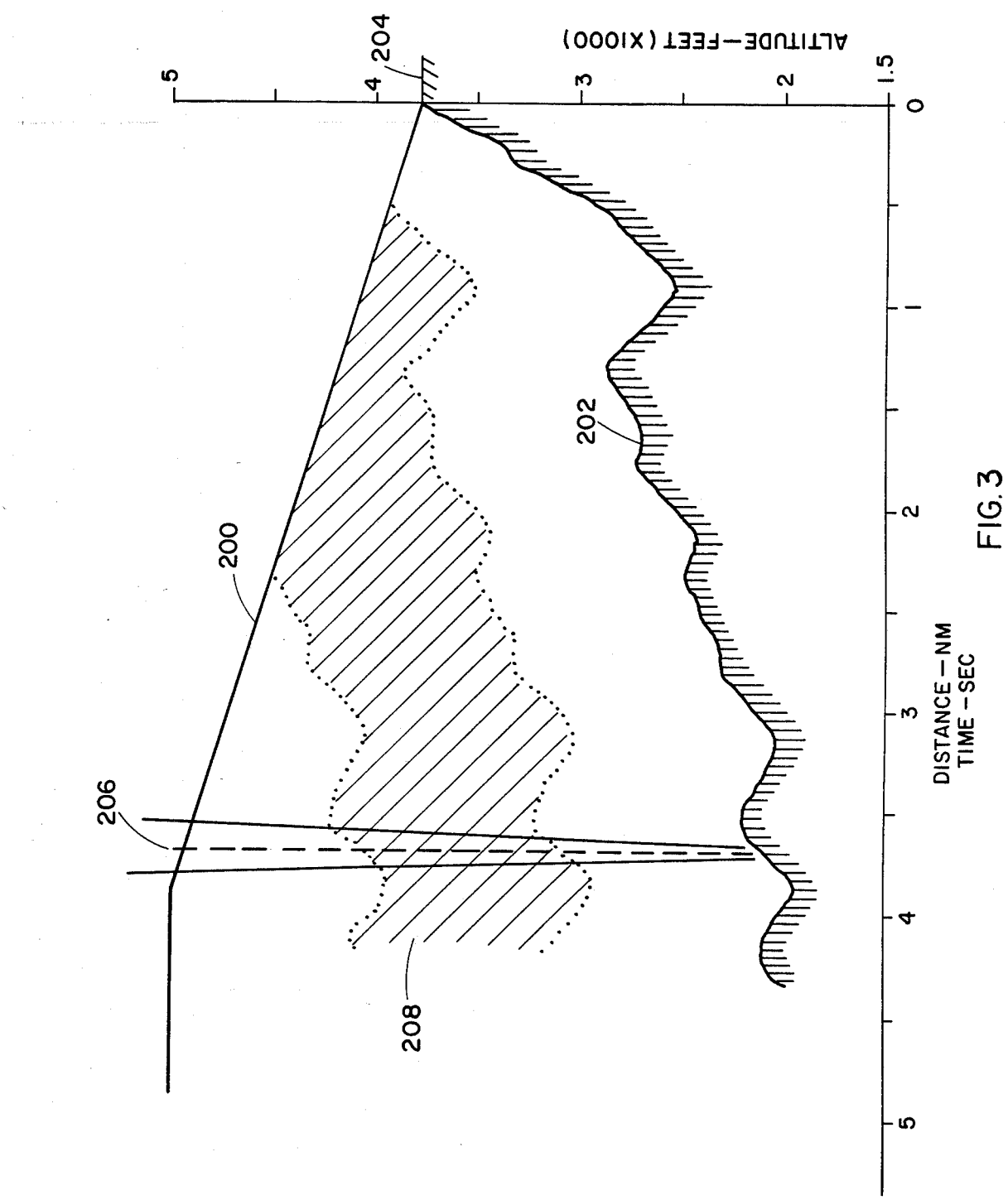
FIG. 3 is a graphical illustration of the flight approach for runway 24 at Hot Springs, Va.

Hot Springs, Va.—ILS RWY 24:—The terrain underlying the Instrument Landing System (ILS) approach to Hot Springs on RWY 24 as shown in FIG. 3 climbs rapidly up to the runway elevation. Consequently, the aircraft may not reach the RAD ALT arming height for Mode 5 (1000 ft. AGL) until nearly ½ NM from the runway threshold, which may be too late for recovery if the aircraft has descended below the runway elevation. Additional protection is provided for this approach by raising the enable RAD ALT of Mode 5 to 2000 ft. AGL for the conditions stated in Table III. The gear down requirement is also removed to expand the Mode 5 applicability.

Kagoshima, Japan—ILS RWY 34:—The terrain underlying the approach to Kagoshima on ILS RWY 34 is similar to that for Hot Springs on ILS RWY 24 as described above, except that the situation is not as pronounced. The corresponding changes for Kagoshima are consequently not as large, enabling Mode 5 at 1500 ft. AGL for the conditions outlined in Table III. Again the gear down requirement is overridden to expand G/S alert protection.

Leeds Bradford, U.K.—ASR RWY 15:—Visual approach to Leeds Bradford on RWY 15 with LOC and Airport Surveillance Radar (ASR) allows for close proximity to precipitous terrain at approximately 2 NM from the runway. This terrain can result in a nuisance Mode 2 warning. Consequently, the Mode 2A and Mode 2B rate limits are lowered to 2380 FPM for the conditions specified in Table II. This prevents a Mode 2 warning for RAD ALTs greater than 300 ft. AGL, which will allow for the expected minimum terrain clearance. Mode 4 is not changed because the gear should be down and airspeed less than 165 KTS at 2.5 NM from the runway.

Lisbon, Portugal—ILS RWY 21:—Precipitous terrain at approximately 6 NM from the runway on approach to Lisbon ILS RWY 21 can result in Mode 2A nuisance warnings due to a 950 ft minimum terrain clearance. This is avoided by limiting the Mode 2A rate to 3200 FPM maximum for the conditions indicative of this approach as outlined in Table II. These limits prevent any Mode 2A nuisance warnings above 947 ft RAD ALT.

Madrid, Spain—ILS RWY 33:—The approach to Madrid on ILS RWY 33 crosses over a river gorge at about 3.6 NM from the runway threshold. The sudden change in RAD ALT resulting from crossing this gorge is sufficient to generate a Mode 2A nuisance warning. Therefore, for the conditions specified in Table II, the Mode 2A limits are reduced to the Mode 2B limit values (3000 FPM). This sets the maximum mode 2 warning ALT to 789 ft. AGL.

Figure 4:
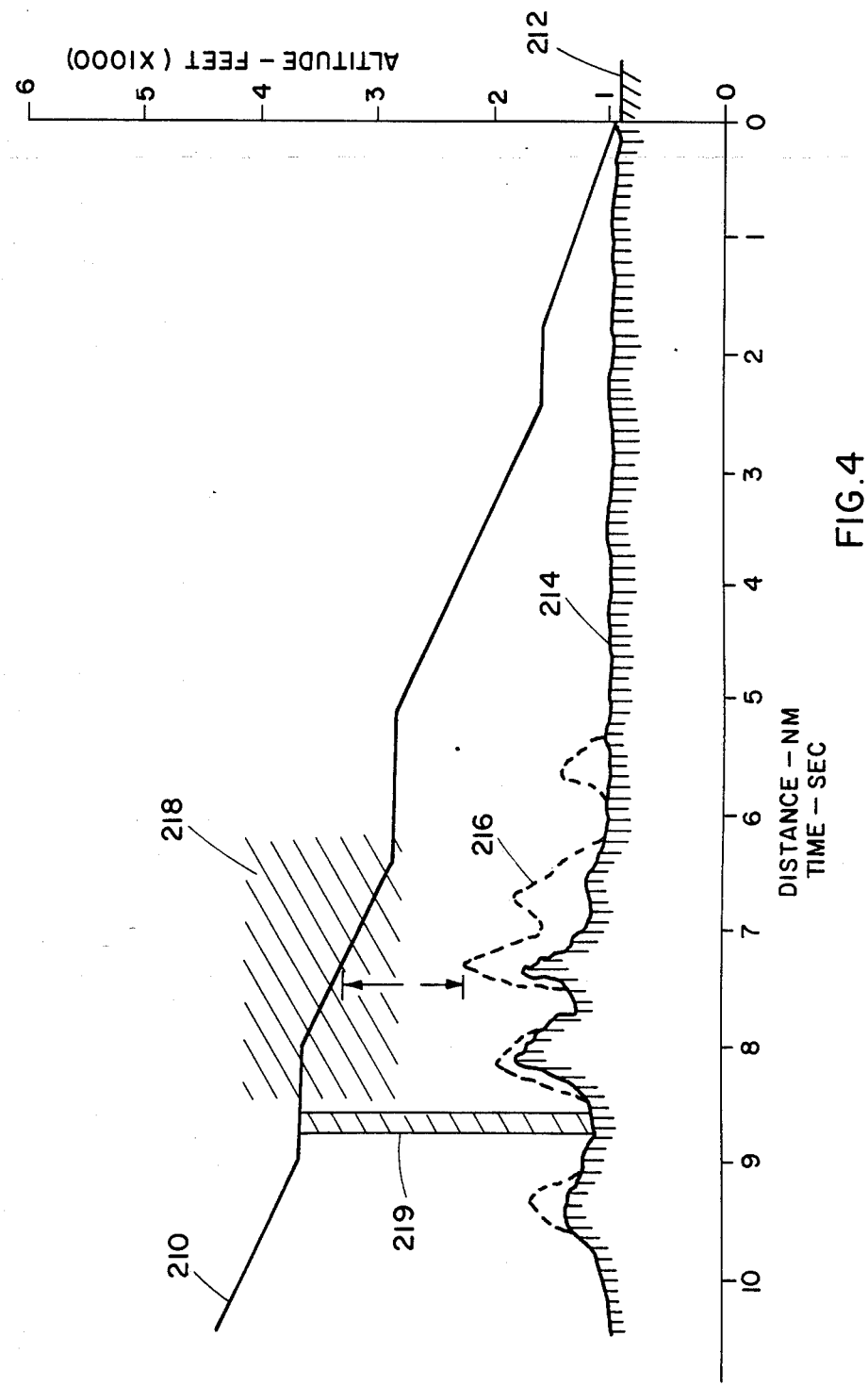
FIG. 4 is a graphical illustration of the flight approach for runway 26R at Ontario, Calif.

Ontario, Calif.—VOR RWY 26R:—The VHF Omnidirectional Range (VOR) approach to Ontario on RWY 26R as shown in FIG. 4 crosses the Jurupa Mountains at approximately 8 NM from the airport. The precipitous nature of the mountains and the reduced terrain clearance combine to make possible Mode 2A nuisance warnings. The nuisance warnings can be avoided by reducing the Mode 2A rate limit value to 3200 FPM. This is done when the conditions indicated in Table II are satisfied and results in nuisance warning immunity for greater than 947 ft. of terrain clearance.

Paine Field, Wash.—ILS RWY terrain profile leading to RWY 16 at Paine Field is such that with a 1000 ft. AGL enable altitude for Mode 5, these modes do not become active until the aircraft is within approximately 1.5 NM of touchdown. The Mode 5 effectiveness can be enhanced at this location by increasing the enable altitude to 1500 ft. AGL and canceling the gear down requirement. This will enable Mode 5 at approximately 2.5 NM from the runway for the conditions given in Table III.

Reno, Nev.—LOC DME (Back CRS)B:—The LOC Back CRS approach to Reno passes over Steamboat Hills at approximately 9 NM from the runway. The assigned flight path is such that a minimum terrain clearance of 975 ft. is possible. Consequently, both Mode 2A and Mode 4 nuisance warnings can occur with sufficient airspeed. By limiting the Mode 2A rate to 3200 FPM and the Mode 4 airspeed enhancement to 244 KTS for the conditions of Table II, a sufficient nuisance warning margin is established.

San Diego, Calif.—LOC (Back CRS) A and LOC DME (Back CRS) RWY 27:—Both LOC AND LOC DME Back CRS approaches to RWY 27 at San Diego involve following the descending terrain down to the runway threshold at barometric descent rates of approximately 1100 FPM with an average terrain clearance of 150 ft. to 200 ft. AGL within 1 NM of the runway. Consequently, Mode 1 "sinkrate" warnings are often generated on this approach. The implementation described herein seeks to eliminate these nuisance warnings when the conditions described in Table I are satisfied. This is accomplished by moving the "sinkrate" envelope 500 FPM to the right. The Mode 1 "pull-up" envelope is also moved 200 FPM to the right to assure at least one "sinkrate" warning prior to "pull-up".

Seoul, Korea—VOR DME RWY 32:—The VOR DME approach to RWY 32 at Seoul passes over precipitous terrain at approximately 11 NM from the airport with a minimum terrain clearance of 760 ft. This makes Mode 2A and Mode 4 nuisance warnings possible. The nuisance warning margin is increased for the conditions specified in Table II by reducing the Mode 2A rate limit to the Mode 2B value (3000 FPM at 789 ft. AGL) and the Mode 4 airspeed enhancement limit to 226 KTS (791 ft. AGL).

St. John's, NFLD—ILS RWY 16:—This ILS approach to RWY 16 at St. John's passes over some steeply rising terrain at approximately 6 NM from the touchdown point. Since the minimum terrain clearance at the highest peak is 1075 ft., Mode 2A nuisance warnings can occur at this location. To rectify this situation, the Mode 2A rate limit is reduced to 3200 FPM for the conditions stated in Table II. This prevents a Mode 2A nuisance warning above 947 ft. AGL.

Tenerife, Canary Islands—ILS RWY 30:—The terrain profiles for ILS approach to RWY 30 at Tenerife raises from sea level to the airport elevation of 2000 ft. in approximately 4 NM horizontal distance. Consequently, Mode 5 is not enabled for standard configuration ground proximity warning systems until the aircraft is within approximately 1.5 NM of the runway. The aircraft could be very low on the approach and no warning would occur until the RAD ALT became less than 1000 ft., which could make recovery difficult if not impossible. Additional protection is provided at this location when identified by the conditions given in Table III. Mode 5 enable RAD ALT is raised to 2000 ft. AGL. The gear down requirement for these modes is removed to expand their applicability. Further, Mode 4 is expanded to 2000 ft. at 370 KTS. Therefore, when the "key" for this approach fits, these changes bias the envelopes to greater RAD ALTs and results in overall protection more consistent with normal approaches.

Vagar, Faroe Island—LOC DME RWY 13:—The LOC DME approach to RWY 13 at Vagar passes over an island peak at the outer marker (8.8 DME). Terrain clearance is such that Mode 2A and Mode 4 nuisance warnings are possible for designated approach procedures. The nuisance warnings are avoided with a reduced Mode 2A rate limit of 3200 FPM and Mode 4 airspeed enhancement limit of 244 KTS. These reduced limits are armed for the conditions listed in Table II and prevent nuisance warnings for a minimum terrain clearance of greater than approximately 950 ft. AGL.

Figure 5:
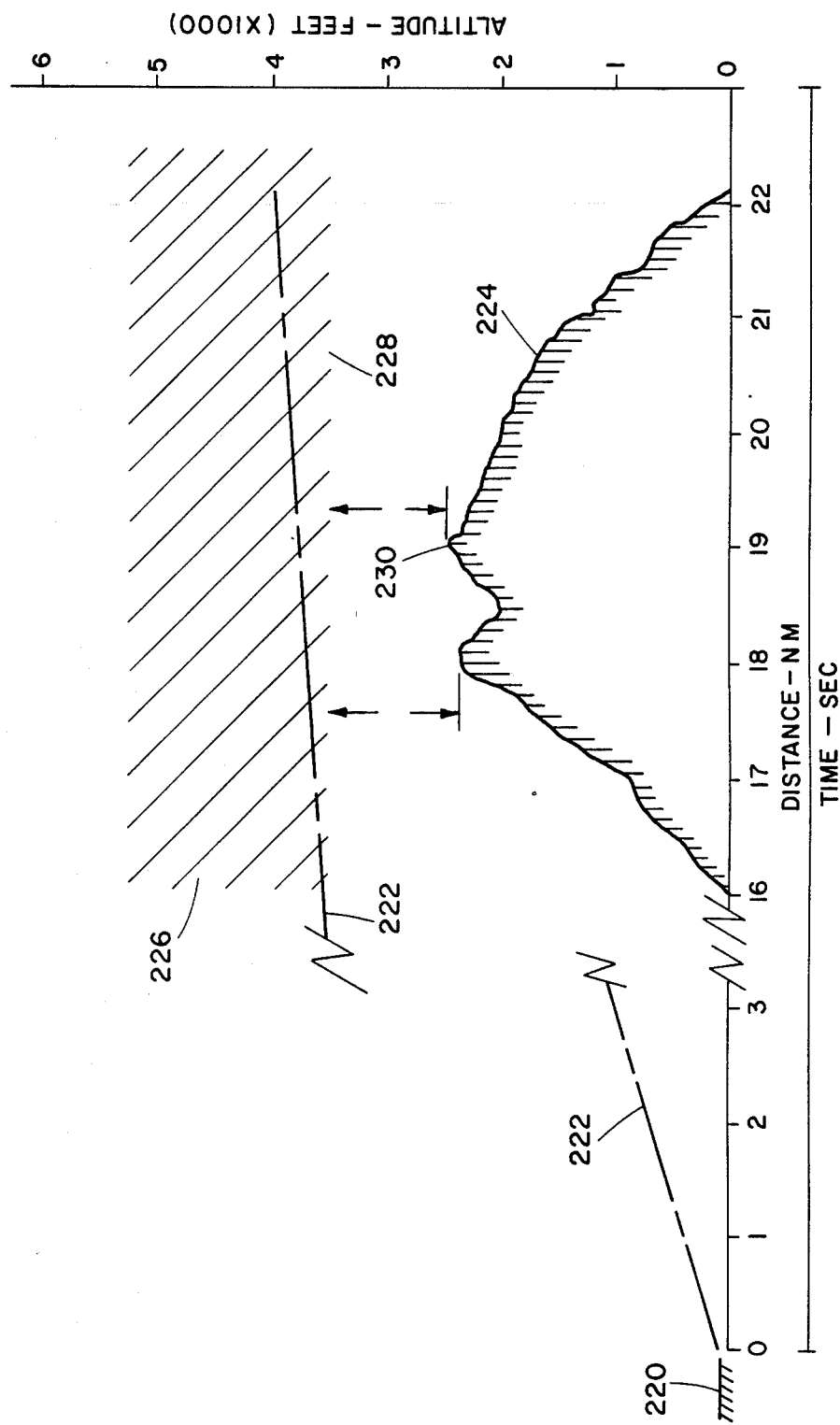
FIG. 5 is a graphical representation of the flight departure for runway 26 at Victoria British Columbia.

Victoria, B.C.—Departure RWY 26 (FIG. 15): Take off procedures from RWY 26 at Victoria as shown in FIG. 5 establish a flight path that passes near a 472 ft. peak approximately 7 NM NW of Victoria. This allows for a minimum expected terrain clearance of approximately 1200 ft. and consequently can result in a Mode 2A nuisance warning with sufficiently steeply rising terrain. Therefore, once this departure flight path is identified by the key outlined in Table II, the Mode 2A rate limit is reduced to 3520 FPM and nuisance warnings are prevented for greater than 1200 ft. of terrain clearance.

Zurich, Switzerland—ILS RWY 14:—The ILS approach to RWY 14 at Zurich passes directly over a 2090 ft. peak just outside of the outer marker. The G/S allows for a minimum terrain clearance of approximately 600 ft. at −2 dots deviation. Consequently, Mode 2A, 2B and Mode 4 nuisance warnings are possible. These nuisance warnings can be prevented by further limiting the Mode 2A and 2B RAD ALT rate to 2760 FPM (600 ft.) and the Mode 4 airspeed enhancement to 202 KTS (600 ft.). This limiting is done for the conditions that identify the corresponding flight path as given in Table II.

TABLE I
LATITUDE/LONGITUDE BASED ENVELOPE MODULATION SUMMARY
Mode 1 Desensitization

| AIRPORT/RWY | ENVELOPE CHANGES | REQUIRED CONDITIONS (KEY) | | | | |
|---|---|---|---|---|---|---|
| | | G/S | LOC | HDG | CRS | CR'D ALT |
| Hong Kong, BCC ILGS RWY 13 (RWY ELEV = 15') | Shift Mode 1 "Sink Rate" Warning 500 FPM to the Right and "Pull Up" Warning 200 FPM to the Right | N/A | N/A | 110° ± 30° | 88° ± 10° | N/A |
| San Diego, CA Loc (Back CRS) RWY 27 (RWY ELEV = 15') | Shift Mode 1 "Sink Rate" Warning 500 FPM to the Right and "Pull Up" Warning 200 FPM to the Right | N/A | ±2 Dots | 272° ± 30° | 92° ± 10° | N/A |

| AIRPORT/RWY | SNAPSHOT AREA | REQUIRED ALTITUDE VERIFICATION CONDITIONS | | |
|---|---|---|---|---|
| | | ALT CK | MAX TIME | ENVELOPE MOD AREA |
| Hong Kong | N/A | N/A | N/A | N22° 19.00' N22° 21.00' E114° 09.46' E114° 11.61' |
| San Diego, CA | N/A | N/A | N/A | N32° 42.27' N32° 44.49' W117° 08.82' W117° 11.20' |

NOTE:
Heading required for ALT CK is same as that for the 'KEY' unless otherwise noted.

TABLE II
LATITUDE/LONGITUDE BASED ENVELOPE MODULATION SUMMARY
Mode 2/Mode 4 Desensitization

| AIRPORT/RWY | ENVELOPE CHANGES | REQUIRED CONDITIONS (KEY) | | | | |
|---|---|---|---|---|---|---|
| | | G/S | LOC | HDG | CRS | CR'D ALT |
| Leeds Bradford, UK ASR RWY 15 (VIS) (Back CRS) (RWY ELEV = 661') | Limit Mode 2A and 2B to 300' (2380 FPM) | N/A | ±2 Dots | 147° ± 30° | 325° ± 10° | >1200' (>539') |
| Lisbon, Portugal ILS RWY 21 (RWY ELEV = 341') | Limit Mode 2A to 947' (3200 FPM) | ±2 Dots | ±2 Dots | 211° ± 30° | 211° ± 10° | N/A |
| Madrid, Spain ILS RWY 33 (RWY ELEV = 1906') | Limit Mode 2A to 789' (3000 FPM) | ±2 Dots | ±2 Dots | 330° ± 30° | 330° ± 10° | N/A |
| Ontario, CA VOR RWY 26R (RWY ELEV = 929') | Limit Mode 2A to 947' (3200 FPM) | N/A | N/A | 263° ± 30° | N/A | >2800' (>1871') |
| Reno, NV LOC DME (Back CRS) B (RWY ELEV = 4412') | Limit Mode 2A to 947' (3200 FPM) and Limit Mode 4 to 950' (244 Kts) | N/A | ±2 Dots | 342° ± 30° | 162° ± 10° | >6500' (>2088') |
| Seoul, Korea VOR/DME RWY 32 | Limit Mode 2A to 789' (3000 FPM) and | N/A | N/A | 319° ± 30° | N/A | >2600' (>2542') |

TABLE II-continued

| | | | | | | |
|---|---|---|---|---|---|---|
| (RWY ELEV = 58') | Limit Mode 4 to 791'(226 Kts) | | | | | |
| St. John's, NFLD ILS RWY 16 (RWY ELEV = 453') | Limit Mode 2A to 947' (3200 FPM) | * ±2 Dots | ±2 Dots | 164° ± 30° | 164° ± 10° | >1600' (>1147') |
| Vagar, Faroe Island LOC DME RWY 13 (RWY ELEV = 268') | Limit Mode 2A to 947' (3200 FPM) and Limit Mode 4 to 950' (244 Kts) | N/A | ±2 Dots | 118° ± 30° | 118° ± 10° | >3300' (>3032') |
| Victoria, B.C. DEPT RWY 26 (RWY ELEV = 55') | Limit Mode 2A to 1200'(3520 FPM) -After Take-Off- | N/A | N/A | N/A | N/A | >3500' (>3445') |
| Zurich, Switzerland ILS RWY 14 (RWY ELEV = 1402') | Limit Mode 2A and 2B to 600'(2760 FPM) and Limit Mode 4 to 600' (202 Kts) | ±2 Dots | ±2 Dots | 139° ± 30° | 139° ± 10° | N/A |

REQUIRED ALTITUDE VERIFICATION CONDITIONS

| AIRPORT/RWY | SNAPSHOT AREA | ALT CK | MAX TIME | ENVELOPE MOD AREA |
|---|---|---|---|---|
| LATITUDE/LONGTITUDE BASED ENVELOPE MODULATION SUMMARY Mode 2/Mode 4 Desensitization | | | | |
| Leeds Bradford, UK | N53° 54.08' N53° 54.28' W01° 41.17' W01° 43.98' | R/A >1200' 200' ± 100' (−461' ± 100') | 21 Sec. | N53° 52.87' N53° 53.90' W01° 40.71' W01° 43.52' |
| Lisbon, Portugal | N/A | N/A | N/A | N38° 52.00' N40° 25.61' W03° 28.69' W03° 31.31' |
| Madrid, Spain | N/A | N/A | N/A | N40° 23.57' N40° 25.61' W03° 28.69' W03° 31.31' |
| Ontario, CA | N34° 00.98' N34° 03.00' W117° 24.05', W117° 24.19' W117° 25.52', W117° 25.67' | R/A >2200' 1000' ± 100' (71' ± 100') | 22 Sec. | N34° 00.98' N34° 03.00' W117° 25.00' W117° 27.50' |
| Reno, NV | N39° 21.48' N39° 21.55' W119° 45.75' W119° 46.43' | R/A >2100' 4775' ± 150' (363' ± 150') | 12 Sec. | N39° 21.89' N39° 22.88' W119° 45.45' W119° 46.73' |
| Seoul, Korea | N37° 25.65', E127° 00.58' E127° 00.58' N37° 23.78', E126° 58.22' E126° 58.50' | R/A >2700' 160' ± 140' (102' ± 140') | 50 Sec. | N37° 25.00' N37° 27.50' E126° 55.25' E126° 59.00' |
| St. John's, NFLD | N47° 40.00' N47° 43.00' W52° 51.13' W52° 51.50' | R/A >2000' 0' ± 50' (−453' ± 50') | 0 Sec. | N47° 40.00' N47° 43.00' W52° 51.50' W52° 51.50' |
| Vagar, Faroe Island | N62° 05.28' N62° 08.30' W07° 40.00' W07° 41.00' | R/A >3300' 0' ± 50' (−268' ± 50') | 50 Sec. | N62° 05.28' N62° 07.29' W07° 30.73' W07° 39.07' |
| Victoria, B.C. | N48° 38.00' N48° 40.00' W123° 23.50' W123° 26.50' | R/A >32' 55' ± 50' (0' ± 50') HDG = 264° ± 30° | 500 Sec. | N48° 43.65' N48° 47.65' W123° 26.97' W123° 33.03' |
| Zurich, Switzerland | N/A | N/A | N/A | N47° 31.25' N47° 33.25' E08° 25.69' E08° 28.72' |

*St. John's, NFLD: Either a maximum G/S Deviation of ±2 Dots or a Snapshot is required to change Mode 2A.
NOTE:
Heading required for ALT CK is same as that for the 'KEY' unless otherwise noted.

TABLE III

LATITUDE/LONGITUDE BASED ENVELOPE MODULATION SUMMARY Mode 5/Mode 6 Increased Arming Altitude

REQUIRED CONDITIONS(KEY)

TABLE III-continued
LATITUDE/LONGITUDE BASED ENVELOPE MODULATION SUMMARY
Mode 5/Mode 6 Increased Arming Altitude

| AIRPORT/RWY | ENVELOPE CHANGES | G/S | LOC | HDG | CRS | CR'D ALT |
|---|---|---|---|---|---|---|
| Hot Springs, VA ILS RWY 24 (RWY ELEV = 3766') | Raise Mode 5 and 6 Enable Alt to 2000' and Override Gear Down Requirements | N/A | N/A | 243° ± 30° | 243° ± 10° | N/A |
| Kogoshima, Japan ILS RWY 34 (RWY ELEV = 891') | Raise Mode 5 and 6 Enable Alt to 1500' and Override Gear Down Requirements | N/A | N/A | 335° ± 30° | 335° ± 10° | N/A |
| Paine Field, WA ILS RWY 16 (RWY ELEV = 565') | Raise Mode 5 and 6 Enable Alt to 1500' and Override Gear Down Requirements | N/A | N/A | 157° ± 30° | 157° ± 10° | N/A |
| Tenerife, Canary Islands ILS RWY 30 (RWY ELEV = 2008') | Raise Mode 5 and 6 Enable Alt to 2000' and Override Gear Down Requirements; Raise Mode 4 to 2000' @ 370 Knots | N/A | N/A | 304° ± 30° | 304° ± 10° | N/A |

| | REQUIRED ALTITUDE VERIFICATION CONDITIONS | | | |
|---|---|---|---|---|
| AIRPORT/RWY | SNAPSHOT AREA | ALT CK | MAX TIME | ENVELOPE MOD AREA |
| Hot Springs, VA | N/A | N/A | N/A | N37° 54.63' N38° 04.53' W79° 37.34' W79° 50.00' |
| Kogoshima, Japan | N/A | N/A | N/A | N31° 38.00' N31° 48.00' E130° 43.00' E130° 54.63' |
| Paine Field, WA | N/A | N/A | N/A | N47° 56.50' N48° 05.73' W122° 09.60' W122° 24.51' |
| Tenerife, Canary Islands | N/A | N/A | N/A | N28° 23.62' N28° 33.30' W16° 08.69' W16° 20.00' |

NOTE:
Heading required for ALT CK is same as that for the 'KEY' unless otherwise noted.

As indicated above, the mechanism for modifying the warning modes as a function of aircraft location is disclosed in the logic diagram of FIG. 1. In order to accomplish this purpose, a condition logic unit 52 is provided that includes an altitude verification logic portion 54 and a key logic portion 56. Operatively connected to the condition logic 52 is a memory unit 58 that serves to store information with respect to various warning locations where it is desirable to modify the warning envelopes. Also included in the system of FIG. 1 is a location search logic unit 60 that is operatively connected to the memory unit 58 by means of a line 62. The primary purpose of the location search logic is to search the memory for warning locations or altitude verification locations and compare that to the aircraft's actual position in latitude and longitude as transmitted from the aircraft data bus 10 over lines 34 and 36. The system of FIG. 1 also includes a data transfer unit 64 which serves to transmit warning variation data from the memory unit 58 by means of a line 66 and a line 68 to the warning logic unit 24.

As shown in FIG. 1 the memory unit 58 includes two major sets of records: an altitude verification location set of records 74 and a warning location set of records 72. In the first location of the altitude verification location records is stored the latitude and longitude boundaries of the area in which the snapshot or altitude verification will be taking place. In a second record area 76 the minimum radio altitude, if required, for proceeding with the snapshot routine is stored. Altitude check information is stored in a third record area 78 that includes the average elevation of the terrain 80 and the maximum deviation from that terrain altitude in 82. Also stored in the altitude verification record 70 is a measure of the required heading of the aircraft 84, the runway elevation 86 of the runway for the warning location associated with the altitude verification location 74 and the maximum time 88 that the aircraft should have taken to travel from the altitude verification location 74 to the associated warning location 90.

In the warning location set of records 72 of the memory 58, stored at location 90 in latitude and longitude are the boundaries of the warning area or location for which the warning envelopes are to be varied or modified. Also included in the warning location record 72 are the various types of flight parameters that are to be used by the key logic 56 in order to determine whether or not the warning logic should be modified. Included in this data are the permitted glideslope deviation 92, the localizer deviation 94, the heading 96, the runway course direction 98, the minimum corrected altitude 100, a flag 102 indicating that the altitude verification should have been accomplished prior to entering the warning location, the runway elevation 104 for the warning location and the warning variation data 106 that is to be transmitted to the warning logic 24 in the event that the aircraft is in the warning location and the various key flight parameters fit the actual aircraft flight parameters.

In operation, when the location search logic 60 indicates that the aircraft is in one of the altitude verification locations as indicated by one of the records 74 a logic signal is transmitted by means of line 108 to the altitude verification logic 54. At this time the snapshot process is initiated where the aircraft's radio altitude, transmitted over line 14, is subtracted from the aircraft's corrected altitude, transmitted over line 46, in a summing junction 110. The output of summing junction 110 on line 112 represents a measure of the altitude of the terrain over which the aircraft is passing. However, if the corrected altitude is in QFE, a logic signal will be transmitted on line 50 thereby causing a switch 114 to connect an altitude check comparator 116 with a second summing junction 118. A second input to the summing junction 118 is a signal on line 120 that represents the runway elevation 86 associated with the altitude verification location. In this case the input to the altitude check comparator 116 will represent on line 122 the effective altitude of the terrain measured in QFE. In the event that the corrected altitude is in QNH units, the logic signal on line 50 will cause the switch 114 to connect line 112 to the comparator 116 thereby providing the altitude check comparator 116 with the value of the terrain altitude above sea level. To ensure reliability, the altitude check comparator 116 takes three snapshot readings of the effective terrain altitude signal 122 and averages them. The function of the altitude check comparator 116 is to compare the value of the altitude of the terrain received over line 122 with the value of the elevation of the terrain 80 from the altitude verification records 70 along with the maximum permitted deviation of that altitude elevation measurement 82 thereby producing an indication of the confidence level of the corrected altitude signal 46. Since the signal 46 depends on the manual input by the pilot of the corrected barometric pressure, this signal is subject to significant error. In the event that the corrected altitude signal on line 46 is within the limits defined by the altitude check data 78, the altitude check comparator will produce a positive logic signal on line 124.

In addition to the above, the altitude verification logic 54 also includes a radio altitude comparator 132 and a heading comparator 134. The radio altitude comparator 132 receives the aircraft's radio altitude signal over line 14 and compares it with a minimum radio altitude value received over line 136 from the altitude verification record 70 and in particular, location 76. When the aircraft's radio altitude is greater than the minimum radio altitude from record 76, a positive logic signal is applied to line 138 by the radio altitude comparator 132. The heading comparator performs a similar function in that the aircraft actual heading as input over line 42 is compared to the desired heading from record 84 over line 140. If the aircraft's actual heading is within the limit specified by record 84, a positive logic signal is applied to the line 142. Connected to each of the logic lines 124, 130, 138 and 142 is an AND gate 144 which will generate a logic signal on output line 146 when there are positive logic signals on each of those lines thereby indicating that a valid altitude verification has been achieved. This signal is then applied to set an altitude verification latch 148.

The signal on line 146 will also activate a timer logic unit 126 which utilizes as an input on line 128 the measure of the maximum time from record 88 permitted for the aircraft to reach the warning location from the altitude verification location. The timer logic unit 126 also receives a logic input from the key logic unit 56 on line 188. In operation the timer logic 126 compares the time from the record 88 to the time when the signal on line 146 indicates that a valid altitude verification had been made. The output of the timer logic on line 130 will indicate that the actual time between the valid altitude verification and satisfying the key logic conditions has exceeded the time stored in record 88. If that time has been exceeded the logic signal on line 130 will reset ALT VF latch 148.

Once the location search logic 60 has determined that the aircraft is in one of the warning locations as indicated by the records 90 in the memory 58, a logic signal over line 150 will initiate the operation of the key logic 56 portion of the condition logic 52. The key logic 56 includes five comparators including a glideslope comparator 152, a localizer comparator 154, a heading comparator 156, a course comparator 158 and a corrected altitude comparator 160. The operation of each of these comparators is similar in that the glideslope comparator 152 compares the aircraft's glideslope signal on line 38 with the required glideslope deviation from the warning location record 92 on line 162. If a glideslope comparison is required and if it is within limits, a positive logic signal will be generated on line 164 by the glideslope comparator 152. Similarly the localizer comparator 154 will compare the localizer signal 40 with a value stored in record 94 on line 165 and a positive logic signal will be applied to line 166 if a localizer comparison is required and if it is within the desired limits. The heading comparator 156 functions in the same manner by comparing the aircraft's actual heading on line 42 to the required heading transmitted from record 96 by means of line 168 to the heading comparator 156 and generates a positive logic signal on line 170 when the heading is within acceptable limits. The course comparator 158 operates similarly by comparing the course signal on line 44 to the course stored in record 98 that is transmitted by means of line 172 to the course comparator 158. If the course dialed into the ILS receiver produces the correct signal on line 44 such that it agrees with the course stored in record 98 a positive signal will be generated on line 174. Another element in the key logic 56 is the corrected altitude comparator that generates a logic signal on line 175 if the corrected altitude of the aircraft on line 46 exceeds the minimum corrected altitude from record 100, that is transmitted to the corrected altitude comparator 160 by means of line 176. It should also be noted that the corrected altitude comparator also receives the QNH/QFE logic signal over line 50 along with runway elevation from record 104 on line 178 so that when the corrected altitude is measured in terms of QFE, the correct result will be achieved by the comparator 160. Along with the outputs from the above five described comparators 152, 154, 156, 158 and 160, AND gate 180 receives a logic input from the altitude verification flag logic 182 over line 184. The altitude verification flag logic unit 182 receives as one input a signal on line 185 from the altitude verification latch 148 and a second input from the flag record 102 on line 186 indicating whether or not a snapshot or altitude verification is required before the aircraft enters the warning location. If it has been required as indicated by the flag from record 102 over line 186 and the altitude verification latch 148 is set indicating an altitude verification has been performed within the allowed time from record 88, a positive signal will be input over line 184 to the AND gate 180. With all positive inputs to AND gate 180 indicating that the conditions for the key have been met, a logic signal will be transmitted over line 188 to the data transfer unit 64 causing the transmission of the appropriate data from record 106 to the warning logic 24 thereby resulting in the appropriate modification of the warning logic contained in the warning logic unit 24. A low signal on line 188 effectively inhibits the modification of the warning logic.

Operation of the ground proximity warning system with provision for varying the warning envelopes as described above is illustrated in FIGS. 3-5. In the flight path profile for Hot Springs, Va. RWY 24 shown in FIG. 3, the ILS flight path is indicated by line 200 with the terrain indicated by the line 202. The runway is indicated at 204 with the middle marker indicated by dash line 206. The dashed area 208 underneath the flight path 200 indicates the area of increased glideslope warning available to the aircraft by increasing the minimum enable altitude for a glideslope warning from 1000 ft. to 2000 ft.

In FIG. 4 is an illustration of a flight path towards RWY 26R at Ontario, Calif. wherein the flight path is indicated by line 210 and the runway is indicated at 212. The terrain is indicated by the solid line 214 and a worst case example of terrain when the aircraft is somewhat left of the center approach line is indicated by the dotted lines 216. Modification of the Mode 2 envelope is indicated by the dashed area within box 218 wherein Mode 2A is limited to 947 ft. AGL. The area in which the altitude verification or radio altitude snapshot occurs is indicated by the dashed lines within area 219. Modification of the Mode 2A envelope for RWY 26 at Victoria, B.C., for an aircraft flight path after takeoff is illustrated in FIG. 5. The flight path of the aircraft after leaving the runway 220 is illustrated by the lines 222. Terrain underneath the takeoff flight path is illustrated at 224. Modification of the Mode 2A warning envelope is indicated by the dashed lines when the aircraft is at an altitude of at least 3500 ft. corrected altitude as indicated by line 228 which is over a thousand feet higher than the peak shown at 230.

It should be understood that in the perferred embodiment of the invention, the logic diagramed in FIG. 1 would be implemented utilizing a microprocessor with the information contained in memory 58 stored digitally in either a random access memory or a read only memory.

We claim:

1. A ground proximity warning system for aircraft comprising:
   a source of signals representing aircraft flight parameters;
   warning logic means operatively connected to said source of flight parameter signals for comparing said flight parameter signals and generating a warning signal in response to predetermined relationships between selected flight parameter signals;
   a source of position signals representing the position of the aircraft; and
   condition logic means operationally connected to said warning logic means and said source of position signals for varying said predetermined relationships when the aircraft is in a predetermined warning location.

2. The system of claim 1 wherein said condition logic means includes key logic means for comparing at least one of said flight parameter signals to a predetermined value when the aircraft is in one of said predetermined warning locations and means for generating an inhibit signal for inhibiting said variation of said predetermined relationships when said compared flight parameter signal is not within specified limits of said predetermined value.

3. The system of claim 1 wherein said source of aircraft flight parameter signals includes a radio altitude signal and a barometric based altitude signal and wherein said condition logic means includes an altitude verification logic means responsive to said radio altitude signal and said position signals for generating an altitude verification logic signal representing a confidence level of said barometric based altitude signal for a specific altitude verification position.

4. The system of claim 3 wherein said altitude verification logic means includes means for combining said radio altitude signal with said barometric based altitude signal to generate a signal representing the elevation of the ground within said altitude verification area.

5. The system of claim 4 wherein said condition logic means include means for inhibiting said variations of said predetermined relationship when said elevation signal is not within predetermined limits.

6. The system of claim 3 wherein said altitude verification logic means includes means for generating a time signal representing time of aircraft travel between said altitude verification position and said predetermined warning location.

7. The system of claim 6 wherein said condition logic means include means responsive to said time signal for inhibiting said variation of said predetermined relationships when said time signal exceeds a predetermined value.

8. The system of claim 2 wherein said source of aircraft signals includes a glideslope deviation signal and said inhibit signal is generated when the glideslope deviation signal exceeds a predetermined glideslope deviation value when the aircraft is in said predetermined warning location.

9. The system of claim 2 wherein said source of aircraft signals include a localizer deviation signal and said inhibit signal is generated when said localizer deviation signal exceeds predetermined limits when the aircraft is in said predetermined warning location.

10. The system of claim 2 wherein said source of aircraft signals includes a heading signal and said inhibit signal is generated when said heading signal deviates from a predetermined heading by a predetermined amount when the aircraft is in said predetermined warning location.

11. The system of claim 2 wherein said source of flight parameter signals includes a course signal and said inhibit signal is generated when said course signal deviates from a predetermined course by a predetermined amount when the aircraft is in said predetermined warning location.

12. The system of claim 2 wherein said source of flight parameter includes a corrected altitude signal and said inhibit signal is generated when said corrected altitude signal is below a predetermined value when the aircraft is in said predetermined warning location.

13. A ground proximity warning system for aircraft comprising:
   a source of radio altitude signals;
   a source of barometric signals;
   a source of glideslope deviation signals;

a source of position signals representing the position of the aircraft;

warning logic means operatively connected to said sources of radio altitude signals, barometric altitude signals and glideslope deviation signals for generating a warning signal in response to predetermined relationships between said radio altitude signals, barometric altitude signals and glideslope deviation signals; and condition logic means operatively connected to said warning means and said source of position signals for varying one or more of said predetermined relationships when the aircraft is in a predetermined warning location.

14. The system of claim 13 additionally including:

a source of localizer deviation signals;

a source of heading signals; and wherein said condition logic means includes key logic means operatively connected to said source of localizer glideslope and heading signals for generating an inhibit signal for inhibiting said variation of said predetermined relationships when one or more of said localizer, glideslope and heading signals is not within specified limits of predetermined values for said signals.

15. The system of claim 14 including memory means for storing a set of said predetermined signal values for each of said predetermined warning locations.

16. The system of claim 15 additionally including a source of corrected altitude signals and wherein said key logic means is responsive to said corrected altitude signal for generating said inhibit signal when the aircraft is below a predetermined corrected altitude.

17. The system of claim 16 wherein said condition logic means additionally includes altitude verification means for verifying said corrected altitude signal.

18. The system of claim 17 wherein said altitude verification means includes means responsive to said radio altitude signal along with said corrected altitude signal for generating a signal representing the altitude of the terrain.

19. The system of claim 18 wherein said altitude verification means includes means for comparing said terrain altitude signal to a predetermined value of terrain altitude and means for causing said inhibit signal to be generated when said terrain altitude signal is not within specified limits of said predetermined value of terrain altitude.

20. The system of claim 19 wherein said altitude verification means is responsive to said position signal for verifying said corrected altitude signal for a predetermined verification position.

21. The system of claim 20 wherein said altitude verification means includes means for comparing said radio altitude signal to a predetermined altitude and for generating said inhibit signal if said radio altitude signal is below said predetermined altitude.

22. The system of claim 20 wherein said altitude verification means includes means for generating said inhibit signal when said heading signal is not within specified limits of a predetermined heading signal in said predetermined verification position.

23. The system of claim 18 additionally including a source of QNH/QFE logic signals and a source of runway elevation signals and wherein said altitude verification means includes means for subtracting said runway elevation from said terrain altitude signal.

24. The system of claim 20 wherein said condition logic includes timer means for effectively measuring the time between said predetermined verification position and said predetermined warning location and for generating said inhibit signal if said time exceeds a predetermined amount.

25. An altitude verification system for aircraft comprising:

a source of signals representing the barometric altitude of the aircraft;

a source of radio altitude signals;

combining means for subtracting said radio altitude signal from said barometric altitude signal to generate a terrain altitude signal; and comparator means operatively connected to said subtracting means for comparing said terrain signal to a predetermined terrain altitude elevation.

26. The system of claim 25 wherein said barometric altitude signal represents the corrected barometric altitude.

27. The system of claim 25 including position determining means for activating said combining and comparator means when the aircraft is in a predetermined verification position.

28. The system of claim 27 additionally including a source of QNH/QFE logic signals and a signal representing runway elevation for a runway associated with said predetermined verification position and wherein said combining means is effective to subtract said runway elevation from said terrain altitude signal when said QNH/QFE logic signal indicates that said corrected altitude signal represents barometric altitude above said runway.

29. The system of claim 25 wherein said combining means includes means for averaging at least three consecutive of said terrain altitude signals together before comparing said average terrain altitude signal to said predetermined terrain altitutde elevation.

* * * * *